United States Patent [19]

Lalin et al.

[11] 4,030,381

[45] June 21, 1977

[54] HYDRAULIC CONTROL DEVICE FOR AUTOMATIC CHANGE-SPEED TRANSMISSIONS

[75] Inventors: André Lalin; Jean Piret, both of Boulogne-Billancourt, France

[73] Assignee: Regie Nationale des Usines Renault, Boulogne-Billancourt, France

[22] Filed: June 3, 1976

[21] Appl. No.: 692,354

[30] Foreign Application Priority Data

June 4, 1975 France .............................. 75.17369

[52] U.S. Cl. .................................. 74/867; 60/484; 91/411 R
[51] Int. Cl.² ........................................ B60K 21/00
[58] Field of Search ............... 60/435, 484; 74/843, 74/861, 867; 91/411 R, 444; 192/3.57, 3.58

[56] References Cited

UNITED STATES PATENTS

| | | | |
|---|---|---|---|
| 3,785,224 | 1/1974 | Will | 74/867 X |
| 3,881,372 | 5/1975 | Miyauchi et al. | 74/867 |
| 3,895,542 | 7/1975 | Miyauchi | 74/867 X |

*Primary Examiner*—Edgar W. Geoghegan
*Attorney, Agent, or Firm*—Fleit & Jacobson

[57] ABSTRACT

Hydraulic control device for automatic change-speed transmissions, especially for motor vehicles, which comprises a fluid reservoir, a pump supplied from said reservoir, a main pressure regulation valve determining the line pressure of the device and supplied from said pump, a hydraulic circuit connected to said main pressure regulation valve and feeding a series of hydraulic receivers through an assembly of auxiliary regulation valves associated with time-lag means, respectively, one of said valves being supplied through a cut-off valve, said device further comprising at least one delivery conduit supplying fluid to a group of hydraulic elements mainly consisting of a flap valve and a gauged orifice connected in parallel.

12 Claims, 10 Drawing Figures

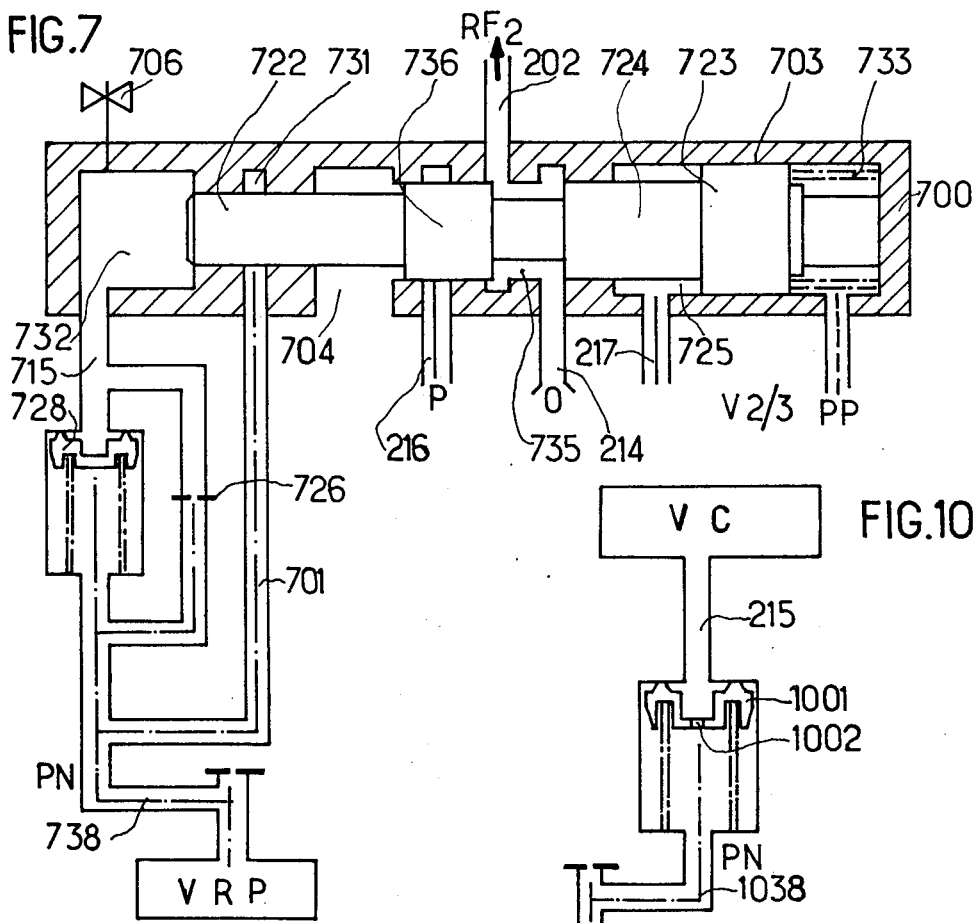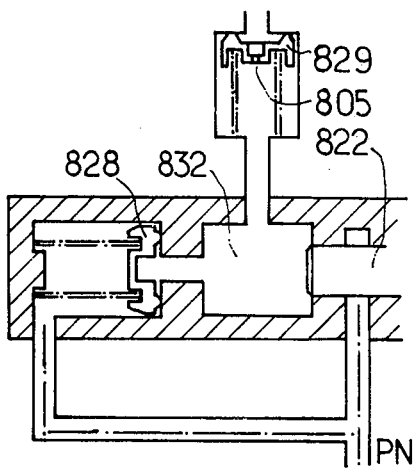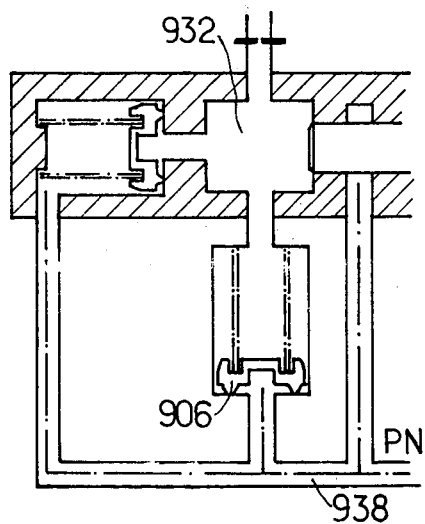

HYDRAULIC CONTROL DEVICE FOR AUTOMATIC CHANGE-SPEED TRANSMISSIONS

The present invention relates to hydraulic deivces for controlling the operation of automatic change-speed transmission mechanism, notably for motor vehicles.

It is known that automatic change-speed transmissions comprise at least one planetary gear and provide between an input shaft and an output shaft a transmission ratio depending on various parameters such as the torque of the driving motor or engine and the vehicle speed.

The suitable transmission ratio is obtained by means of brakes and clutches actuated selectively by means of a hydraulic control device, and it is the essential object of the present invention to provide an improved control device of this kind.

Changing from a given ratio to the next higher ratio is obtained in the known manner by actuating a first braking device or engaging a first clutch while releasing a second device, this release occurring only when, or just after, the actuation of the first device, in order to limit the rotational velocity of the engine and prevent the latter from racing.

A transient period elaspses however between these two operations to permit the engine acceleration up to a speed consistent with the novel transmission ratio.

In a known hydraulic device one fraction of the clutches and brakes are supplied with hydraulic control fluid via auxiliary pressure-regulating valves in order to modulate the clutch engaging or brake application force during speed changes, as a function of the engine torque, from a so-called "line" pressure transmitted through a main regulation valve supplied from a reservoir by means of a pump. Each auxiliary regulation valve is associated with time-lag means consisting of a variable-capacity chamber formed by a bore of the time-lag means and by a piston slidably mounted in said bore. This piston is responsive to spring means constantly tending to reduce the volume of this chamber.

During the supply of control fluid to a brake or a clutch, the chamber of said time-lag means is pressurized through a gauged orifice and this pressure is equal to the modulation pressure delivered by the auxiliary regulation valve. This pressure causes the piston of said time-lag means to move during the entire regulation phase. When the speed or gear change is completed, the piston of said time-lag means causes the auxiliary regulation valve to assume a state of unbalance in the direction to casue the clutch or brake supply conduits to be subjected to said line pressure.

With this known procedure it is not possible to bring any modification in the arrangement of the various component elements of the device, notably the arrangement of the time-lag means and of the slide valve associated therewith.

When changing from one fear ratio to the next lower ratio, the transient period elapsing between the release of the first device (clutch or brake) and the engagement or application of the second device is determined by the time necessary for the movement of the sliding spool of a cut-off valve disposed upstream of this second device, and this valve controls the application of the above-defined line pressure to the assembly comprising said auxiliary regulation valve and the time-lag means of the second device.

During its movement the cut-off valve spool is responsive to pressures depending on the engine torque and speed, and also to the force of a spring. This movement causes the hydraulic fluid contained in a chamber formed between the spool and the body of said cut-off valve to be forced via an exhaust conduit and through a gauged orifice into a pipe line connected to the fluid reservoir.

The range of the time periods during which the cut-off valve spool is moved (which vary as a function of the engine torque and speed) is relatively reduced and furthermore this range is responsive to temperature. Moreover, this range of the time periods during which the cut-off valve spool is moved is also responsive to the volumes of gas contained in the oil filling the chamber formed between said spool and said valve body.

In fact, the low viscosity of the oil at high temperature is attended by undesired leakages, in addition to the oil output flowing through said gauged orifice, thus reducing the time of said cut-off spool movement to proportions which, in certain cases, may prove very detrimental.

It is the essential object of the present invention to increase the range of time periods during which the spool of said cut-off valve is moving;

a. by reducing the time of travel of said spool when changing the transmission ratio to greater gear reduction, when the vehicle is running at low speed and when the engine torque is relatively high, b. by increasing the time of travel of said spool during the same gear change when the vehicle is driven at high speed and when the engine torque is low.

It is another object of this invention to provide a hydraulic control device of the type set forth which is so arranged that the movements of the cut-off valve spool take place in substantially the same time period, whatever the operating temperature, while extracting any gas contained in the exhaust chamber of said cut-off valve.

Another object of this invention consists in providing a hydraulic control device capable of supplying hydraulic fluid to selected brakes and clutches through an assembly comprising an auxiliary regulation valve and the time-lag device the mounting of which is thus greatly simplified.

According to this invention, the hydraulic control device is characterised in that an auxiliary regulation valve is supplied with hydaulic fluid via a spool-type cut-off valve of which at least one exhaust port supplies said fluid via a pipe line to at least one assembly of members comprising a flap valve and a gauged orifice disposed in parallel. If necessary, a pressure line may supply fluid to an auxiliary chamber disposed between said exhaust chamber and a groove connected to the fluid reservoir. Said exhaust chamber is provided with gas-extraction means and the values of the pressures attained in said auxiliary chamber and said exhaust chamber differ only slightly from each other.

According to another feature characterising this control device, the piston of the time-lag device provides with its bore a movable annular chamber and during at least one fraction of its stroke said piston uncovers a port opening into said chamber and connected to a second chamber formed between said spool and the body of the auxiliary regulation valve so that, by either connecting said second chamber to the reservoir or admitting fluid under pressure into said second chamber the equilibrium of the auxiliary regulation valve spool can be upset at the end of the change-speed operation in order to eliminate any frictional sliding movement in the hydraulic receiver involved without resorting to any additional spool.

Other features and advantages of this invention will appear as the following description proceeds with reference to the accompanying drawings illustrating diagrammatically by way of example a typical form of embodiment of a hydraulic device for controlling an automatic change-speed transmission mechanism providing three forward and one reverse gear ratios. In the drawings:

FIG. 1 illustrates the hydraulic control device in the condition corresponding to the operation when the third or top gear is engaged;

FIG. 2 illustrates the sequential diagram of the logic of the changes of transmission ratios;

Figures 1, 2:
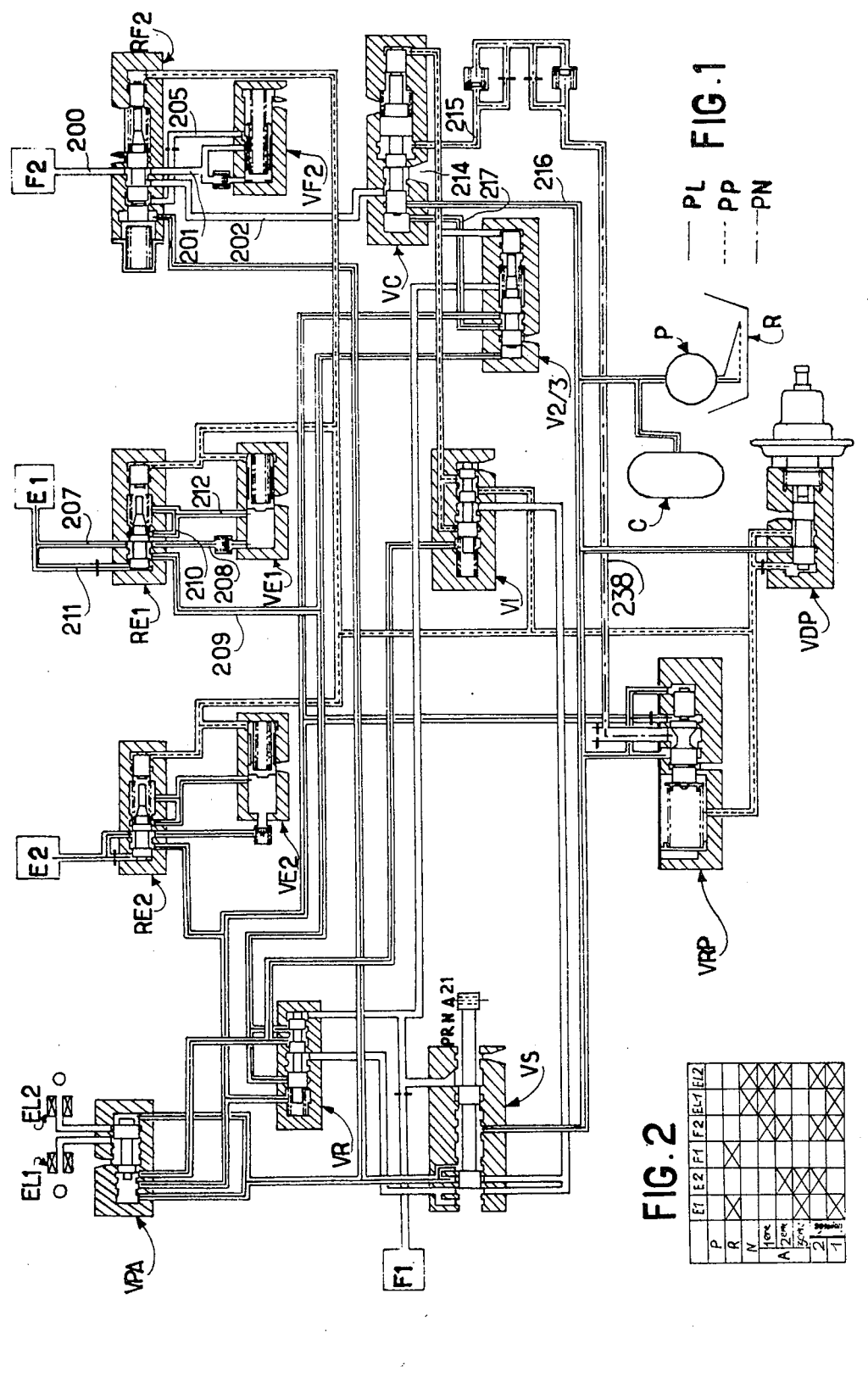
Figure 3:
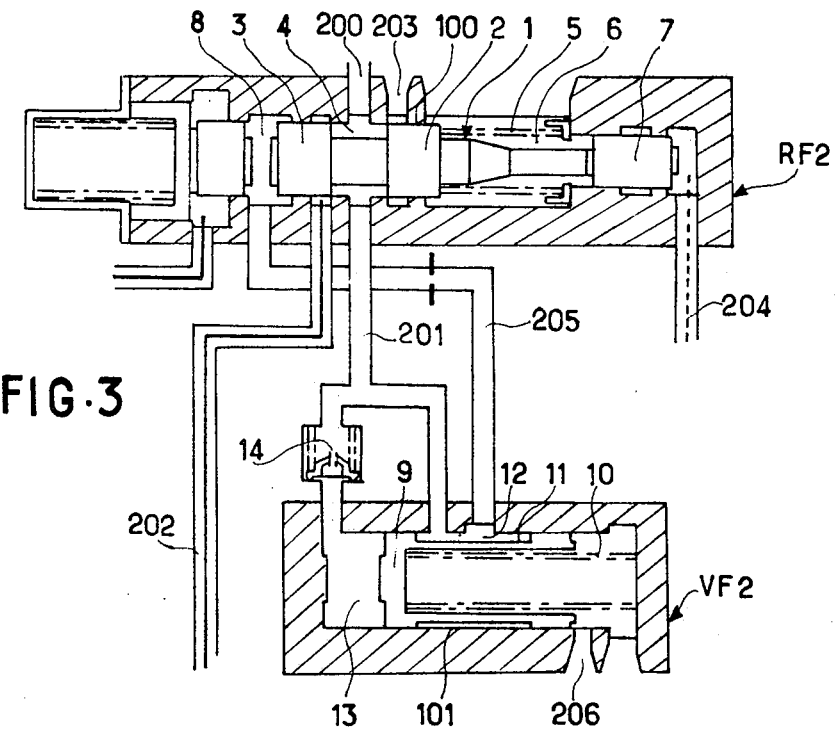
FIGS. 3 and 4 illustrate two phases of the operation of the assembly comprising the auxiliary regulation valve and the time-lag device associated with a hydraulic receiver.

Referring first to FIG. 1, the various transmission ratios are obtained through the selective actuation of clutches E1, E2 and brakes F1, F2 constituting the assembly of hydraulic receivers.

The main component elements of the hydraulic control device are:

a volumetric pump P driven from the vehicle engine (not shown) and having an output proportional to the engine speed; this pump P supplies from a reservoir R the necessary fluid to the several hydraulic devices and also to the torque converter C;

a main pressure regulation valve VRP determining in a manner known per se and therefore omitted from this description the value of the line pressure PL in the circuit as a function of a monitored pressure PP, the latter being subordinate to the engine torque and delivered through the monitoring valve VDP. The main pressure regulation valve VRP also delivers fluid under a pressure PN depending on the engine speed;

a manually-operated selection valve VS of which the spool is adapted in a manner known per se to occupy stable positions corresponding to the positions P, R, N, A, 2 and 1 of the gear selector (not shown);

a passage vlave VPA the spool of which is adapted to occupy in a manner known per se three stable positions, the movements of said spool being controlled by the means of a pair of solenoid valves EL1 and EL2 the energization of which is subordinate to the vehicle speed, the position of the accelerator pedal and the selector position;

a relay valve VR inserted in the energizing circuit of clutch E1;

three assemblies comprising each three auxiliary regulation valves RE1, RE2 and RF3 associated with three time-lag devices VE1, VE2 and VF2, respectively, and disposed upstream of the aforesaid hydraulic receivers E1, E2 and F2 a cut-off valve VC completing the assembly RF2, VF2 in the feed line of brake F2;

a control valve V2/3 for actuating the cut-off valve VC, and a so-called "set-speed" valve VI.

To simplify the disclosure, in the arrangement illustrated in FIG. 1, the various pipe lines for supplying and interconnecting the various component elements of the device have been omitted. Therefore, only the hydraulic connections leading to or from the hydraulic control device constituting the subject-matter of this invention will be described hereinafter.

The auxiliary regulation valve RF2 inserted in the feed circuit of brake (FIGS. 3 and 4) comprises a spool 1 slidably movable in a bore 100. This spool 1 comprises two lands 2 and 3 of same cross-sectional area, forming with the bore 100 a first chamber 4 connected to a pair of pipe lines 200 and 201. Pipe line 200 is connected directly to the hydraulic receiver F2. In certain positions of spool 1 this first chamber 4 is connected through ports either to a pipeline 202 connected in turn to the cut-off valve VC or to a discharge pipe line 203 connected to the reservoir R.

This spool 1 is responsive to a spring 5 disposed in a second chamber 6 and also to a push-member 7 responsive in turn to the monitored pressure prevailing in a pipe line 204 supplied via the monitoring valve VDP.

The land 3 of spool 1 bounds with bore 100 a third chamber 8 connected via a pipe line 205 to the time-lag device VF2.

This time-lag device VF2 comprises a piston 9 slidably mounted in a bore 101 and responsive to the force of a spring 10. The outer periphery of piston 9 comprises a shouldered portion 11 forming with the bore 101 an annular chamber 12 movable with the piston 9 and adapted either to connect the pipe line 205 via pipe line 206 to the fluid reservoir R, or to interconnect the first and third chambers (4 and 8) of the auxiliary regulation valve RF2. This last-mentioned connection is obtained via connecting lines 201 and 205. The piston 9 further provides in conjunction with the bore 101 in which it is slidably mounted a second chamber 13 communicating with the first chamber 4 of the auxiliary regulation valve RF2 via a pipe line 201 and a gauged orifice 14.

Figures 5, 6:
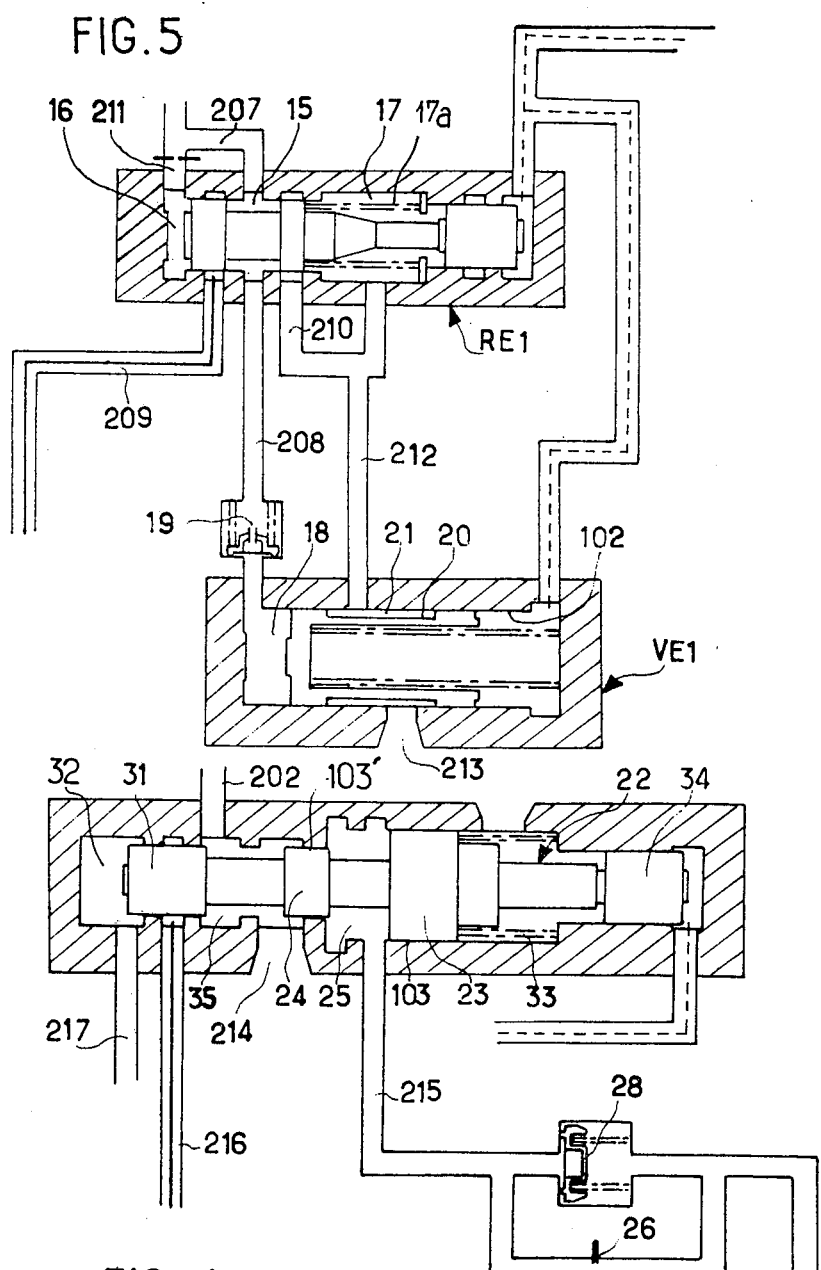
FIG. 5 illustrates an assembly comprising an auxiliary regulation valve and its time-lag device associated with another type of hydraulic receiver.
FIG. 6 illustrates the cut-off valve supplying fluid under pressure to an assembly comprising an auxiliary regulation valve and a time-lag device, and FIGS 7 to 10 inclusive illustrate other possible forms of embodiment of the cut-off valve.

The auxiliary regulation valve RE1 inserted in the feed circuit of clutch E1 is the same as the above-described auxiliary regulation valve RF2, the only difference lying in the connections between the chambers of regulation valve RE1 and the time-lag device VE1, as can be seen in FIG. 5. As in the preceding example two pipe lines 207 and 208 open into the first chamber 15 of this auxiliary regulation valve RE1. Pipe line 207 is connected directly to the hydraulic receiver E1 and pipe line 208 interconnects the first chamber 15 and second chamber 18 of time-lag device VE1 via a gauged orifice 19. In other alternate positions of the sliding member or spool of said auxiliary regulation valve RE1, either of pipe lines 209, 210 open likewise into said first chamber 15. Pipe line 209 delivers the line pressure when actuating the clutch E1. The other pipe line 210 is an exhaust line of the auxiliary regulation valve RE1. The chambers 15 and 16 of the auxiliary regulation valve RE1 corresponding to the first and third chambers, respectively, of said valve, are interconnected through conduits 207 and 211.

As already mentioned in connection with device VF2, in a similar manner the peripheral shoulder or cavity 20 of the piston of time-lag device VE1 provides with the bore 102 a movable annular chamber 21 so that during one fraction of the piston stroke the second chamber 17 of the auxiliary regulation valve RE1 can be connected to the reservoir R via pipe lines 212 and 213. During another fraction of the piston stroke in said time-lag device VE1, the second chambers 17 and 18 of the auxiliary regulation valve RE1 and time-lag device VE1, respectively, communicate with each other via a pipe line 212.

Now reference will be made to FIG. 6 illustrating a first form of embodiment of the cut-off valve VE comprising a spool member 22 slidably mounted in a bore 105 of the valve body. A pair of lands 23, 24 having different diameters provide with the bore 103 a first chamber 25. According to the position of said spool 22, this chamber 25 may communicate with the reservoir via a pipe line 214 or with a delivery conduit 215 so as to connect this chamber 25 with the source of pressure PN as a function of the engine speed through a pair of gauged orifices 26 and 27.

Mounted in parallel with each one of said gauged orifices 26 and 27 is a flap valve 28, 29 normally seated by a spring. A pair of lands 24 and 31 having the same diameter form with the bore 103' a second chamber 35 connecting the pipe line 202 either to the reservoir (via pipe line 214) or to the pipe line 216 in which the line pressure prevails, according to the position of said spool 22. The land 31 forms with the bottom of bore 103' a third chamber 32 connected to a pipe line 217 either responsive to the line pressure or connected to the reservoir. The spool 22 of this cut-off valve VC is responsive to the force of a spring 33 and also to the action of a push member 34 responsive in turn to the monitored pressure proportional to the engine torque.

Now the mode of operation of the hydraulic device comprising a cut-off valve corresponding to the form of embodiment of FIG. 6 during the change from third gear to second gear will be described. FIG. 1 illustrates the condition of the assembly during the operation in third gear. The pipe lines in which the line pressure PL prevails are designated by a solid line. The pipe lines in which the monitored pressure PP prevails are designated by dash lines. Furthermore, the pipe lines in which the pressure PN depending on the engine speed are shown in phantom lines. As illustrated in FIG. 2, it will be seen that the gear shift is obtained by modifying the condition of the solenoid valve EL2. The hydraulic fluid contained in the assembly comprising the auxiliary regulation valve and the time-lag device (RE1, VE1) of clutch E1 is drained by means of the relay valve VR and passage valve VPA. Draining fluid (oil) from this clutch E1 will cause the spool of valve VE2/3 to be shifted, whereby the pipe line 217 previously receiving the line pressure PL will be connected to the reservoir R. The monitored pressure PP acting on the push member 34 and the force of spring 33 will move the spool 22 of cut-off valve VC to the left as seen in FIG. 6, thus forcing the oil content of the first chamber 25 into the conduit 238 through the gauged orifices 26 and 27 and, in certain cases, through flap valves 28 and 29.

Figure 4:
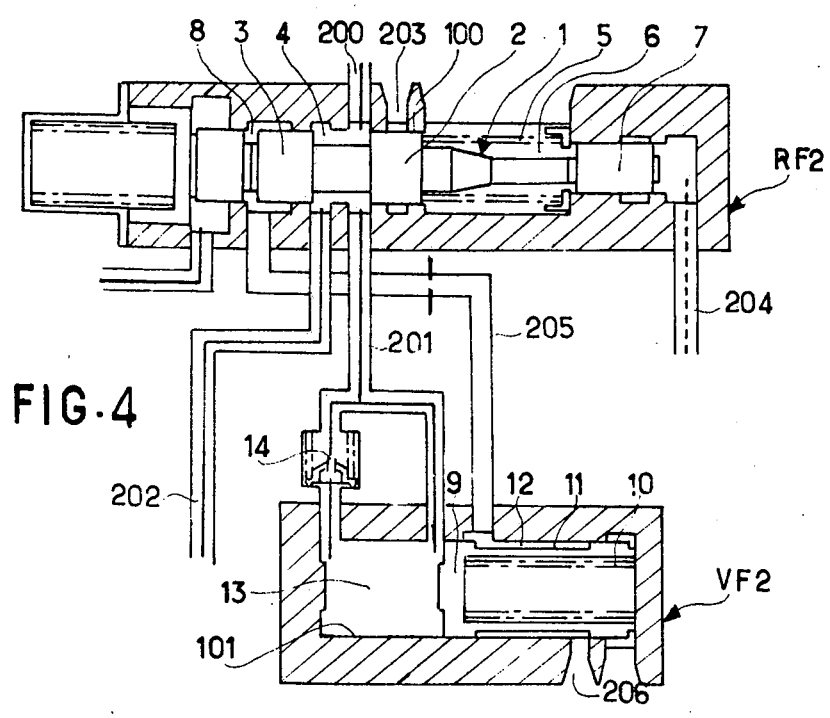

The shift time of spool 22 depends both on the engine torque transmitted via the monitored pressure PP and on the engine speed transmitted via the pressure PN. At high torque values (higher pressure exerted on push member 34) and low engine speeds (low PN pressure in conduit 238) valve 28 and/or 29 open to permit the free flow of fluid to the reservoir. The free cross-sectional fluid passage area through said flap valves 28, 29 varies as a function of the engine torque and of the engine rotational speed. Therefore, this device will afford a more considerable staging of the shift times of spool 22 as a function of the engine torque and speed. At the end of the movement of spool 22, the shoulder 23 closes the port leading to pipe line 215 while the first chamber 25 communicates with the reservoir via pipe line 214. Due to the force of spring 33 and to the monitored pressure PP, the spool 22 abuts to the left-hand end of its valve body as seen in FIG. 6. The second chamber 35 interconnects pipe lines 216 and 202, the latter receiving the line pressure PL. The spool 1 of the auxiliary regulation valve RF2 assumes a regulation position as illustrated in FIG. 3. The regulation pressure prevailing in the first chamber 4 depends on the characteristics of spring 5 and also on the monitored pressure PP. The regulation pressure is available in conduit 201, annular chamber 12, pipe line 205 and third chamber 8. The second chamber 13 of the time-lag device is filled with fluid while the piston 9 moves to the right as seen in FIG. 3. This position of piston 9 closes the port leading to pipe line 201 and annular chamber 12 causes the pipe line 205 to communicate with the reservoir and also with the third chamber 8 of the auxiliary regulation valve RF2. Thus, the equilibrium of spool 1 is upset, and this spool assumes the position shown in FIG. 4. Thus, the regulation phase is completed and the full line pressure prevails in the hydraulic receiver F2.

The assembly comprising the auxiliary regulation valve RE1 and the time-lag device VE1 associated with clutch E1 differs from the assembly RF2, VF2 in that during the entire regulation phase illustrated in FIG. 5 (showing the change to third or top gear) the cavity 20 permits the draining of the second chamber 17 of the auxiliary regulation valve RE1 to the reservoir. Upon completion of the piston stroke of time-lag device VE1 the land of this piston uncovers the port of pipe line 212 and the latter connects the second chamber 18 of time-lag device VE1 to the second chamber 17 of the auxiliary regulation valve RE1. The pressure prevailing in the second chamber 18 now prevails also in the second chamber 17. An additional thrust combined with the force of spring 17a is exerted against the spool of the auxiliary regulation valve, so that the equilibrium of this spool is upset and the spool moves to the left as seen in FIG. 5. The line pressure in pipe line 209 will thus build up in the hydraulic receiver E1 via pipe line 207.

FIG. 7 illustrates another possible form of embodiment of the cut-off valve VC comprising a spool 722 slidably mounted in a bore 703.

Two shoulders 723, 736 of different diameters are formed in the spool 722 for defining with the valve body 700 two chambers 725 and 704, respectively. The first chamber 725 is connected via a pipe line 217 to valve V2/3 either responsive to the line pressure or connected to the reservoir, according to the sequence of operation contemplated.

The other chamber 704 communicates with the reservoir. A pair of shoulders 736 and 724 of the same diameter form with the body of the cut-off valve a chamber 735 connected via pipe line 202 to the auxiliary regulation valve RF2. According to the position of spool 722, one of the pipe lines 216 or 214 also opens into this chamber 735, the first line 216 being responsive to the line pressure PL, while the other line 214 is connected to the reservoir.

The end of the sliding spool 722 of this cut-off valve VC provides with the body 700 a delivery chamber 732 connected to a pipe line 715 communicating with pipe line 738 in which the pressure PN prevails through a gauged orifice 726. In parallel with this gauged orifice 726 is a flap valve 728.

Between the delivery chamber 732 and chamber 704 is an annular chamber 731 bounded by the spool 722 and valve body 700. Opening into this annular chamber 731 is a pipe line 701 connected to the pipe line 738 in which the pressure PN proportional to the engine speed prevails. The delivery chamber 732 comprises at its upper portion a gas-extraction device 706. Moreover, the spool 722 of cut-off valve VC is responsive to the force of a spring 733 and also to the monitored pressure PP exerted in conjunction with said force against the shoulder 723.

The device will now be described with reference to a change or shift from thired or top gear to second or intermediate gear.

As mentioned hereinabove, FIG. 1 illustrates the condition of the control device during the operation in top or third speed or gear.

When shifting to second gear the pipe line 217 is connected to the reservoir as mentioned with reference to FIG. 6.

The spool 722 of cut-off valve VC is moved to the left as seen in FIG. 7 by the force of spring 733 and also of the monitored pressure PP forcing the volume of oil contained in chamber 732 through the gauged orifice 726 of said gas extraction device 706 and also, in certain cases, through the flap valve 728.

The volume of gas contained in the delivery chamber 732 was eliminated before the shift to second gear by gravity and also as a consequence of the pressure prevailing in said chamber when the third or top gear is engaged. This pressure tends to cause hydraulic fluid to flow towards the reservoir, thus promoting the circulation of gaseous volumes from said chamber 732 to the reservoir via the gas-extraction device 706.

During the shift from top gear to intermediate gear and as the spool 722 moves to the left as seen in FIG. 7, hydrualic fluid leakages between chamber 732 and chamber 731 formed by the valve body become negligible notwithstanding the fluidity of the relatively hot oil. This is due to the fact that the pressure differential is rather small between the two pressures prevailing in chambers 732 and 731, respectively (mainly when the engine speed is relatively high and the engine torque is relatively low). Stray leakages from the delivery chamber 732 are thus substantially negligible.

FIG. 8 illustrates a modified form of embodiment of the cut-off valve which differs from the form of embodiment of FIG. 7 only by the elimination of the gauged orifice 726. The chamber 832 is filled through a first flap valve 829. The slow movements of spool 822 to the left as well as the extraction of gas by gravity from chamber 832 are controlled through the single gauged orifice 805 formed through the valve member 829. The fast movements of spool 822 are controlled by a second flap valve 828 the opening of which occurs simultaneously with the flow of fluid through the orifice 805. This second flap valve will thus control an orifice in chamber 832.

Another possible mode of connecting the delivery chamber of the cut-off valve is illustrated in FIG. 9. The filling flap valve 906 is disposed between the delivery chamber 932 and a pipe line 938 in which the pressure PN is maintained. The function of flap valve 906 is to fill the chamber 932.

FIG. 10 illustrates another form of embodiment of the cut-off valve which differs from the construction shown in FIG. 6 in that a single flap valve 1001 comprising a gauged orifice 1002 is substituted for the assembly of two flap valves comprising two gauged orifices disposed in parallel.

Although specific forms of embodiment of this invention have been described hereinabove and illustrated in the accompanying drawing, it will readily occur to those skilled in the art that various modifications and changes may be brought thereto without departing from the scope of the invention as set forth in the appended claims.

What is claimed as new is:

1. Hydraulic control device for automatic change-speed transmissions, especially for motor vehicles, which comprises a fluid reservoir, a pump supplied from said reservoir, a main pressure regulation valve determining the line pressure of the device and supplied from said pump, a hydraulic circuit connected to said main pressure regulation valve and feeding a series of hydraulic receivers through an assembly of auxiliary regulation valves associated with time-lag means, respectively, one of said valves being supplied through a cut-off valve, said device further comprising at least one delivery conduit supplying fluid to a group of hydraulic elements mainly consisting of a flap valve and a gauged orifice connected in parallel.

2. Hydraulic control device as set forth in claim 1, wherein said delivery conduit of said cut-off valve opens into a delivery chamber formed between the valve body and the end of its sliding spool.

3. Hydrualic control device as set forth in claim 2, wherein said delivery chamber formed between the body of the cut-off valve and the end of its sliding spool is connected to a gas-extraction device.

4. Hydraulic control device as set forth in claim 2, wherein said cut-off valve comprises an auxiliary feed conduit opening into an annular chamber formed in the valve body between said delivery chamber and a chamber communicating with the reservoir.

5. Hydraulic control device as set forth in claim 4, wherein the auxiliary conduit supplying hydraulic fluid to the cut-off valve opens into the delivery pipe line of the pressure regulation valve in which pipe line the fluid pressure is proportional to the rotational velocity of the engine driving the change-speed transmission.

6. Hydraulic control device as set forth in claim 3, wherein the delivery chamber formed between the body of the cut-off valve and the end of the sliding spool thereof is adapted to supply hydraulic fluid to a gas-extraction device consisting of a gauged orifice formed in a first flap valve, a second orifice of said chamber being associated with a second flap valve.

7. Hydraulic control device as set forth in claim 3, wherein said delivery chamber formed between the body of said cut-off valve and the end of its sliding spool is inserted in a supply circuit comprising a flap valve, notably for filling purposes, on which a pressure proportional to the rotational velocity of the engine driving the change-speed transmission is exerted in a direction to open said flap valve.

8. Hydraulic control device as set forth in claim 1, wherein the gauged orifice controlling the movements of the spool of said cut-off valve is formed through the flap valve inserted in the delivery conduit of said valve.

9. Hydraulic control device for automatic change-speed transmission, especially for motor vehicles, which comprises a fluid reservoir, a pump supplied from said reservoir, a main pressure regulation valve determining the line pressure in the device and supplied from said pump, a hydraulic circuit connected to said main pressure regulation valve and supplying fluid under pressure to a series of hydraulic receivers through the medium of a set of auxiliary regulation valves associated with time-lag means, respectively, one of said auxiliary regulation valves being supplied through a cut-off valve, the movable piston of said time-lag means comprising a movable chamber formed between a portion of reduced diameter of said piston and the piston bore, so that during one fraction of the piston stroke said chamber is connected to a pipe line connected in turn to a chamber formed between the sliding spool and the body of said auxiliary regulation valve.

10. Hydraulic control device as set forth in claim 9, wherein a pipe line opens both into the movable annular chamber of said time-lag device and into the first chamber of the auxiliary regulation chamber, a second pipe line opens both into said movable annular chamber and into a third chamber of said auxiliary regulation valve during one fraction of the stroke of the piston of said time-lag device, and during another fraction of said piston stroke a pipe line connected to the reservoir opens into said movable annular chamber.

11. Device as set forth in claim 9, wherein said movable annular chamber of said time-lag means is connected to a first auxiliary pipe line leading to said reservoir, and a second auxiliary pipe line opens both into a second chamber of said auxiliary regulation valve and into said movable annular chamber, according to the position of said movable annular chamber.

12. Device as set forth in claim 11, wherein said second auxiliary pipe line communicates with a second chamber of said time-lag means which is formed between the piston and the bore of said time-lag device, according to the position of said piston.

* * * * *